(12) United States Patent
Lu

(10) Patent No.: US 7,942,166 B1
(45) Date of Patent: May 17, 2011

(54) DEVICES FOR DELIVERING GAS

(75) Inventor: James Lu, Fremont, CA (US)

(73) Assignee: JAtech Precision (H.K.) Limited, Kwai Chung, N.T. (HK)

( * ) Notice: Subject to any disclaimer, the term of this patent is extended or adjusted under 35 U.S.C. 154(b) by 398 days.

(21) Appl. No.: 12/115,467

(22) Filed: May 5, 2008

(51) Int. Cl.
*F15D 1/04* (2006.01)
(52) U.S. Cl. .............. 138/39; 138/43; 138/46; 137/892; 137/891; 251/121
(58) Field of Classification Search .................... 138/42, 138/44–46; 239/423, 424, 590; 137/889, 137/892, 891; 366/163.1, 163.2; 251/120, 251/121
See application file for complete search history.

(56) References Cited

U.S. PATENT DOCUMENTS

| | | | |
|---|---|---|---|
| 2,383,215 A * | 8/1945 | Reynolds | 236/12.22 |
| 5,054,688 A * | 10/1991 | Grindley | 239/407 |
| 5,799,831 A * | 9/1998 | Spriggs et al. | 222/132 |
| 6,293,294 B1 * | 9/2001 | Loeb et al. | 137/1 |
| 7,416,326 B2 * | 8/2008 | Sakata et al. | 366/163.2 |

* cited by examiner

*Primary Examiner* — Patrick F Brinson
(74) *Attorney, Agent, or Firm* — IP Strategy Group, P.C.

(57) ABSTRACT

A device for delivering gas is disclosed. The device may include a chamber and a guide. The chamber may include a set of input openings for receiving the gas and an output opening for providing the gas. The set of input openings may include a first hole and a second hole. The chamber may receive a first portion of the gas through the first hole and a second portion of the gas through the second hole. The guide may include a guiding unit. The guiding unit may be disposed inside the chamber. The guiding unit may contact the first portion of the gas before the first portion of the gas contacts the second portion of the gas and may contact the second portion of the gas before the second portion of the gas contacts the first portion of the gas.

20 Claims, 7 Drawing Sheets

US 7,942,166 B1

DEVICES FOR DELIVERING GAS

BACKGROUND OF THE INVENTION

The present invention relates to devices for delivering air or gas. In general, air/gas-delivering devices may be utilized in delivering air to air tools, such as air brushes, pneumatic drills, pneumatic screwdrivers, pneumatic nail guns, etc. Other applications of air/gas-delivering devices may involve delivering air/gas to air/gas chambers, combustion engines, etc.

FIG. 1 shows a cross-sectional view of an example prior art gas-delivering device 100 coupled with a hose 102 and a plug 104 for delivering air, for example, to actuate an air tool. Hose 102 may be connected to an air supply device, such as an air compressor. Plug 104 may be coupled with the air tool or may represent a part of the air tool. Gas-delivering device 100 may include several input openings, such as holes 110 and 160, for receiving the air from hose 102. For example, hole 110 may receive an airflow 112, which may represent a portion of input air 150 provided through hose 102; hole 160 may receive an airflow 162, which may represent another portion of input air 150.

Typically, airflows 112 and 162 may have substantially the same pressure and may enter gas-delivering device 100 in opposite directions. Accordingly, a conflict 114 may occur between the airflows 112 and 162 such that the energy of airflows 112 and 162 may cancel each other. Consequently, energy may be substantially wasted, and output air 118 delivered to the air tool through plug 104 may not have sufficient energy, density, and/or pressure for property actuating and/or operating the air tool.

In order to properly actuate and operate the air tool, additional energy may be consumed to further pressurize input air 150. Unfortunately, further pressurizing input air 150 may further pressurize the opposite airflows 112 and 162 to aggravate conflict 114 and cause further waste of energy. As a result, the efficiency of energy utilization in operating the air tool may be undesirable.

SUMMARY

An embodiment of the present invention relates to a device for delivering one or more gases. The device may include a chamber and a guide. The chamber may include a set of input openings for receiving the one or more gases and an output opening for providing the one or more gases. The set of input openings may include a first hole and a second hole. The chamber may receive a first portion of the one or more gases through the first hole and a second portion of the one or more gases through the second hole. The guide may include a guiding unit. The guiding unit may be disposed inside the chamber. The guiding unit may contact the first portion of the one or more gases before the first portion of the one or more gases contacts the second portion of the one or more gases, and the guiding unit may contact the second portion of the one or more gases before the second portion of the one or more gases contacts the first portion of the one or more gases.

The above summary relates to only one of the many embodiments of the invention disclosed herein and is not intended to limit the scope of the invention, which is set forth in the claims herein. These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
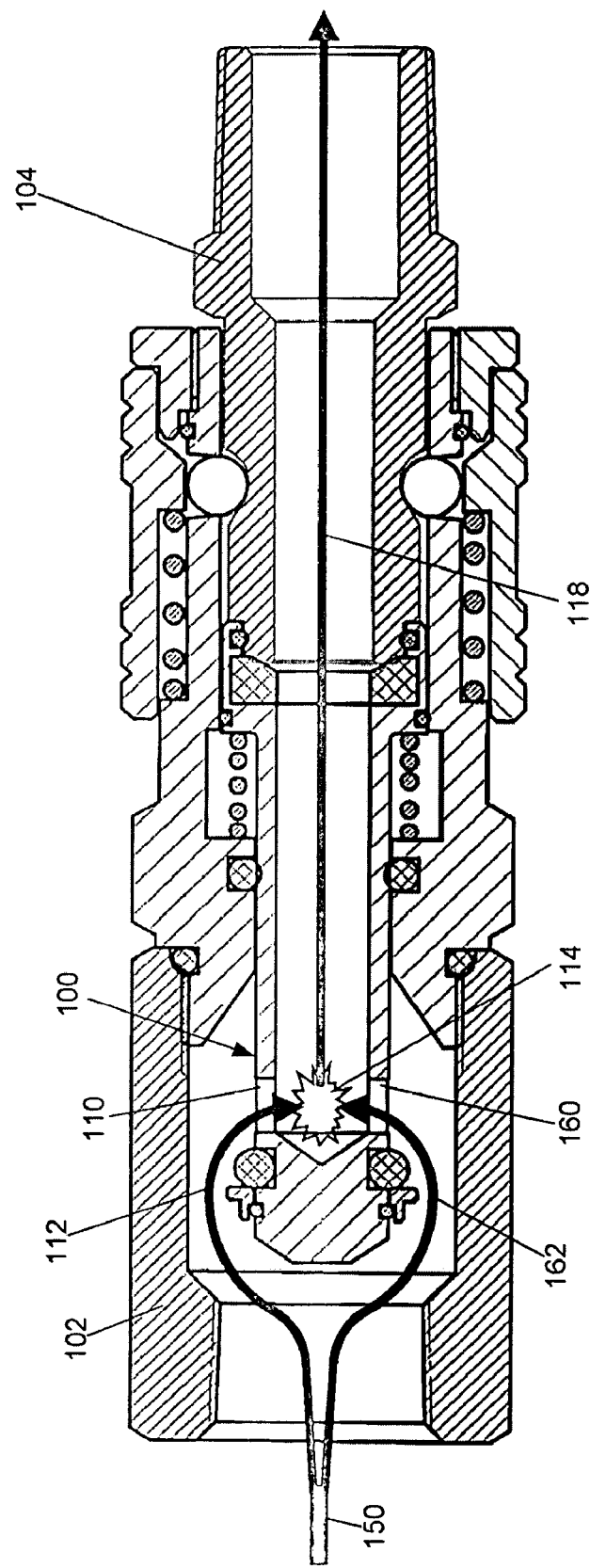
FIG. 1 shows a cross-sectional view of an example prior art gas-delivering device coupled with a hose and a plug for delivering air, for example, to actuate an air tool.

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

One or more embodiments of the invention relate to a device for delivering one or more gases to a tool, such as an air tool, an air/gas chamber, or a combustion engine. The device may include a chamber, which may serve as a conduit for the one or more gases, and a guide, which may guide the flow of the one or more gases. For facilitating understanding, the following discussions may utilize air as an example for the one or more gases, though embodiments of the invention may also be utilized in delivering gases other than air.

The chamber may include a set of input openings for receiving the air from an air source and an output opening for providing the air to the tool. For example, the set of input openings may include a first hole and a second hole; the chamber may receive a first portion of the air through the first hole and may receive a second portion of the air through the second hole. The input openings may be symmetrically or asymmetrically distributed along a perimeter of the chamber; the input openings may be arranged in an aligned or unaligned fashion. Asymmetrical and unaligned arrangements may reduce the cancellation of energy caused by conflicts of airflows, thereby improving the energy efficiency in operating the tool.

The guide may include a guiding unit that may be disposed inside the chamber. The guiding unit may guide the airflows received from different input openings to travel toward the output opening without substantially traveling toward one another to cause conflicts. For example, the guiding unit may contact and guide the first portion of the air before the first portion of the air contacts and potentially conflicts with the second portion of the air; the guiding unit may also contact and guide the second portion of the air before the second portion of the air contacts and potentially conflicts with the first portion of the air. Accordingly, energy may be further conserved, and the energy efficiency in operating the tool may be further improved over prior art arrangements.

The guiding unit may occupy a substantial portion, e.g., at least one tenth, of the space inside the chamber, thereby reducing the volume of the air in the chamber. As a result, the density of the air may be increased for effectively actuating and operating the tool.

The guide may also include a regulating element disposed at an end of the guiding unit near the output opening. The regulating element may further compress the air before the air is provided to the tool for further increasing the density of the air, thereby further improving the effectiveness in actuating and operating the tool.

The regulating element may be an integral part of the guiding unit. Alternatively or additionally, the regulating element may be a replaceable part connected to the end of the guiding unit and may be replaced with different regulating elements for satisfying needs for different air density levels and/or different airflow patterns.

The guide may also include a coupling portion. The coupling portion may securely couple the guide with the chamber, such that the guiding unit may guide the flow of the air in a stable fashion.

One or more embodiments may relate to the guide for use in a gas-delivering device.

Given the features discussed above, the gas-delivering device and/or the guide according to one or more embodiments of the invention may facilitate the maximization of energy efficiency, effectiveness, and stability in operating air tools, air chambers, combustion engines, etc.

The features and advantages of the present invention may be better understood with reference to the figures and discussions that follow.

Figure 2A:
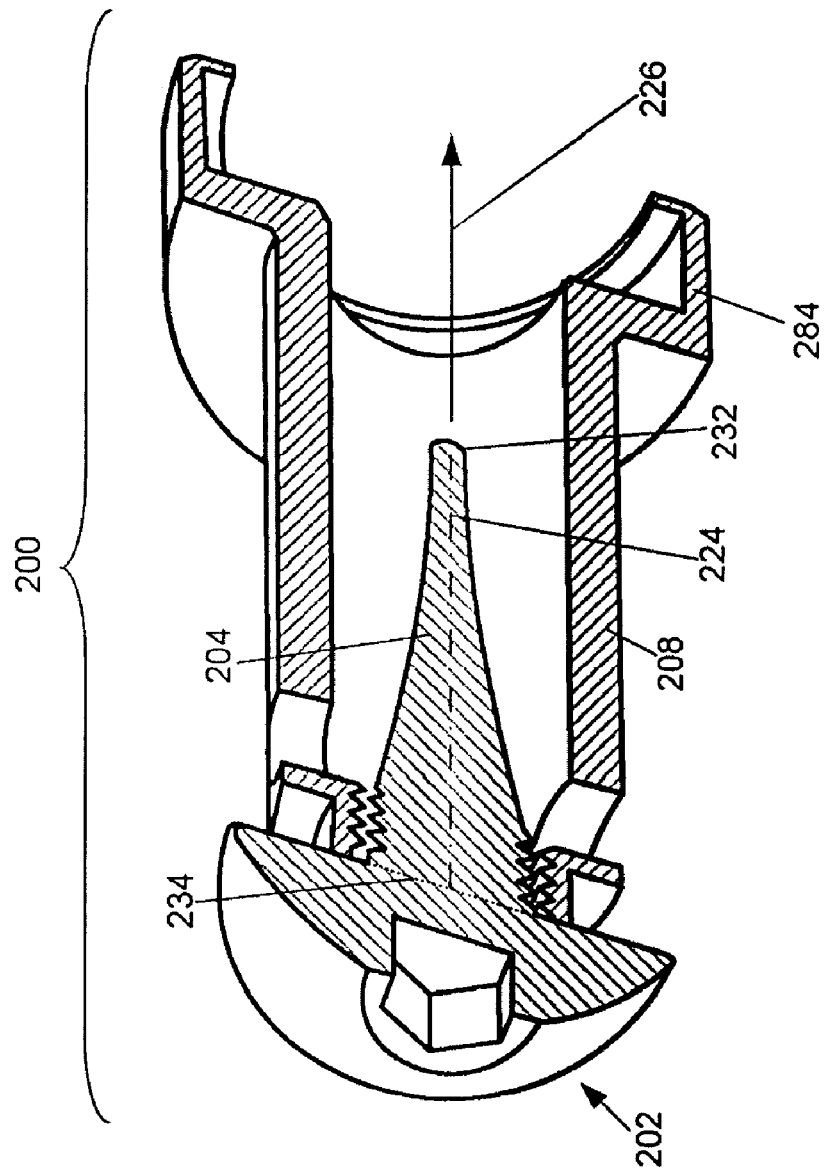
FIG. 2A shows a cutaway view of a gas-delivering device in accordance with one or more embodiments of the present invention.

FIG. 2A illustrates a cutaway view of a gas-delivering device 200 in accordance with one or more embodiments of the present inventions. In one or more applications, gas-delivering device 200 may be coupled with a hose and a plug, for example, similar to hose 102 and plug 104 illustrated in the example of FIG. 1, for delivering air from an air supply to a tool for operating the tool. Gas-delivering device 200 may include a coupling section 284 to couple with the plug or the tool. Gas-delivering device 200 may also include a chamber 208, which may serve as a conduit for the air. Gas-delivering device 200 may also include a guide 202, which may have a guiding unit 204 extending inside chamber 208 for guiding the flow of the air. An imaginary center axis 224 that connects two ends 232 and 234 of guiding unit 204 may align with a desirable direction 226 in which the air is provided from gas-delivering device 200 to the tool such that the flow of the air may be properly guided.

Figure 2B:
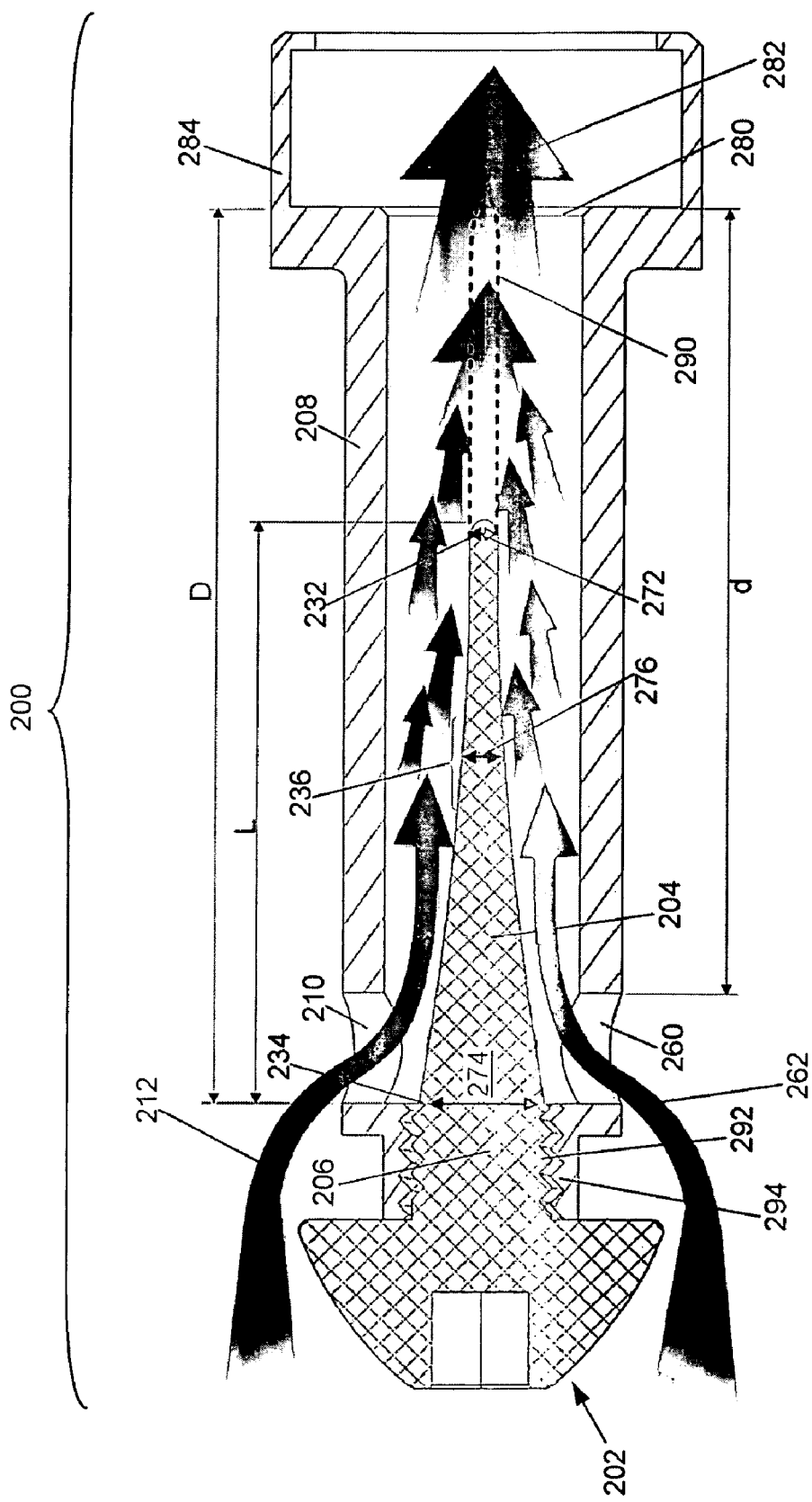
FIG. 2B shows a cross-sectional view of a gas-delivering device in accordance with one or more embodiments of the present invention.

FIG. 2B illustrates a cross sectional view of gas-delivering device 200 in accordance with one or more embodiments of the present invention. Chamber 208 may include a set of input openings for receiving the air from an air source (e.g., through the hose) and an output opening 280 for providing the air to the tool. For example, the set of input openings may include a hole 210 and a hole 260. Hole 210 may receive an airflow 212, which may represent a first portion of the received, input air; hole 260 may receive an airflow 262, which may represent a second portion of the input air. The cross-sectional shape(s), the interior profile, etc. of chamber 208 may be configured with manufacturability, costs, airflow characteristics, applications, etc. taken into account. As an example, chamber 208 may have substantially cylindrical interior and exterior profiles.

Guide 202 may include a guiding unit 204 that may be disposed inside the chamber 208. Guiding unit 204 may guide the airflows received from the input openings to travel toward output opening 280 without substantially conflicting with one another. In particular, guiding unit 204 may contact and guide airflow 212 toward output opening 280 before the airflow 212 contacts and potentially conflicts with airflow 262; guiding unit 204 may also contact and guide airflow 262 before airflow 262 contacts and potentially conflicts with airflow 212. With reduced conflicts, energy may be conserved, and the energy efficiency in operating the tool may be further improved over the prior art arrangement.

The cross-sectional shape(s), the profile, the arrangement, the material, etc. of guiding unit 204 also may be configured with manufacturability, costs, airflow characteristics, etc. taken into account.

For example, the length of guiding unit 204 may be configured long enough to sufficiently guide the airflows and reduce potential conflicts. As an example, the length L of guiding unit 204 may be at least two thirds (⅔) of distance d between hole 210 and output opening 280. As another example, the length L of guiding unit 204 may be at least two thirds of length D of chamber 208. In one or more embodiments, as illustrated by an extended portion 290, the length of guiding unit 204 may be at least distance d between first hole 210 and output opening 280 or at least length D of chamber 208, for guiding the air through out chamber 208.

Guiding unit 204 may have circular cross sections and may be symmetrically disposed along a central axis of chamber 208, with imaginary axis 224 (illustrated in the example of FIG. 2A) that connects a first end 232 and a second end 234 of guiding unit 204 aligned with the direction of output air 282. Accordingly, the manufacturing cost for gas-delivering device 200 may be minimized, and the supply of output air 282 may be substantially homogenous.

Guiding unit 204 may also have an elongated configuration extending from the proximity of the input openings (e.g., holes 210 and 260) toward output opening 280 with decreasing cross-sectional areas. In particular, cross-sectional area 272 of first end 232 may be smaller than cross-sectional area 274 of second end 234, wherein first end 232 is disposed closer to output opening 280 than second end 234, which may be near and/or surrounded by the input openings. Further, cross-sectional area 276 of an intermediate section 236 disposed between first end 232 and second end 234 may be smaller than cross-sectional area 274 of second end 234 and larger than cross-sectional area 272 of first end 232. According, the airflows may be effectively and energy-efficiently guided toward output opening 280. In one or more embodiments, guiding unit 204 may be cone-shaped or at least include a cone-shaped portion.

Guiding unit 204 may occupy a substantial portion, e.g., at least one tenth, at least one eighth, or at least one sixth, of the space inside the chamber 208, thereby reducing the volume of the received air. As a result, the density and/or the flow rate of the air may be increased, and output air 282 may have sufficient density for effectively actuating and operating the tool.

Guide 202 may also include a coupling portion 206 for securely couple guide 202 with chamber 208, such that guiding unit 204 may guide airflows in a stable fashion. In one or more embodiments, coupling portion 206 may include a thread 292 for engaging a thread 294 of chamber 208.

Accordingly, guiding unit 204 may remain stable with respect to chamber 208 when being subjected to pressures from the airflows.

The parts of gas-delivering device 200 may be made of one or more materials well known in the art, such as copper, stainless steel, aluminum, composite material, and/or plastic, to satisfy design requirements.

Figure 3A:
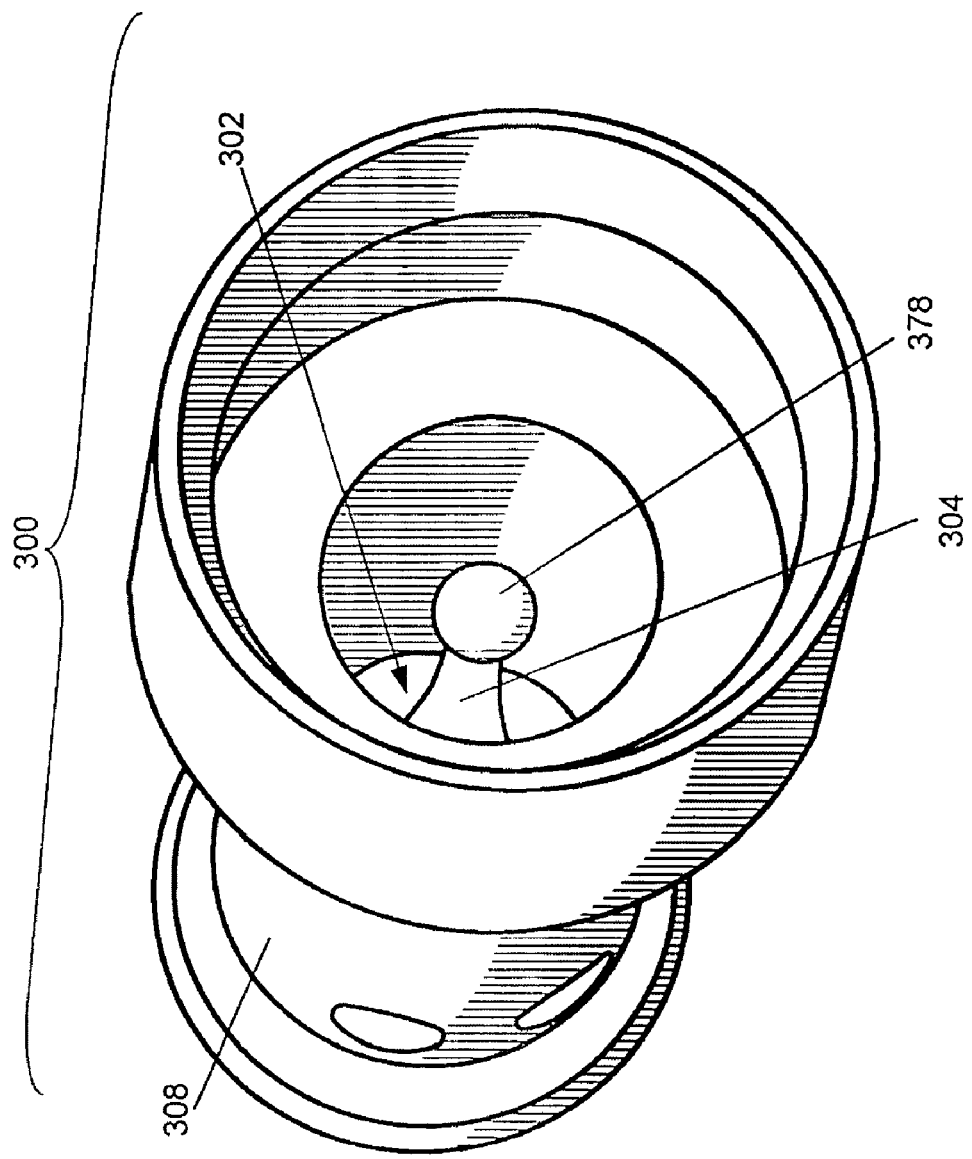
FIG. 3A shows a perspective view of a gas-delivering device in accordance with one or more embodiments of the present invention.
Figure 3B:
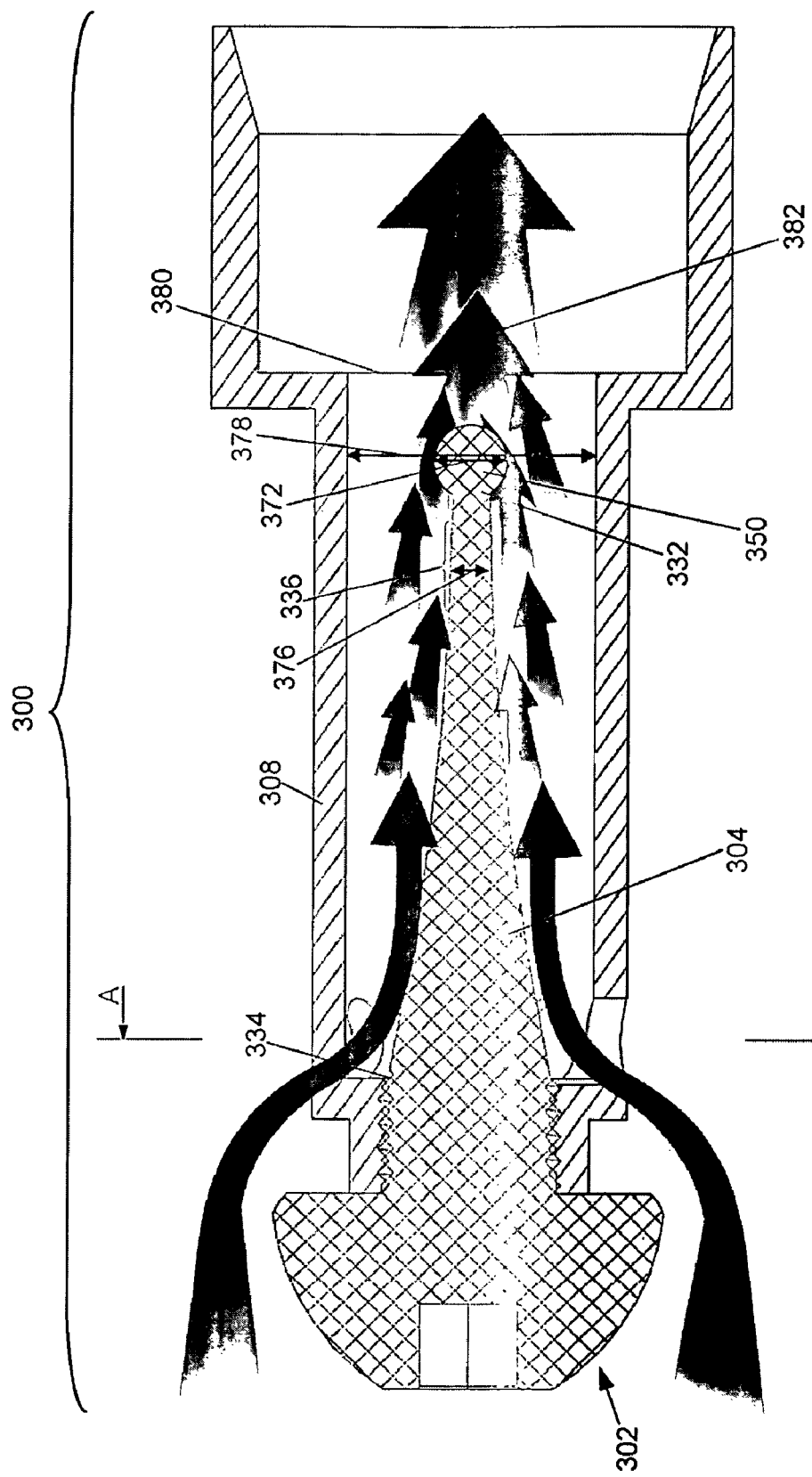
FIG. 3B shows a cross-sectional view of a gas-delivering device in accordance with one or more embodiments of the present invention.

FIG. 3A illustrates a perspective view of a gas-delivering device 300, in accordance with one or more embodiments of the present inventions. FIG. 3B illustrates a cross sectional view of gas-delivering device 300 in accordance with one or more embodiments of the present invention. In one or more applications, gas-delivering device 300 may be coupled with a hose and a plug, for example, similar to hose 102 and plug 104 illustrated in the example of FIG. 1, for delivering air from an air supply to a tool for operating the tool. Gas-delivering device 300 may include a chamber 308 and a guide 302 that includes a guiding unit 304 extending inside chamber 308. Each of chamber 308 and guide 302 may include one or more features of chamber 208 and/or guide 202 discussed with reference to the examples of FIGS. 2A and 2B.

In addition, guide 302 may further include a regulating element 350 for further regulating the air. The profile, the position, the material, etc. of regulating element 350 may be configured with manufacturability, costs, airflow characteristics, etc. taken into account. For example, regulating element 350 may be positioned for further increasing the density of the air right before the air is provided to the tool. Accordingly, regulating element 350 may be disposed at a first end 332 of guiding unit 304, which may be disposed closer to output opening 380 of guiding unit 304 than a second end 334 of guiding unit 304. Further, cross-sectional area 372 of regulating element 350 may be configured greater than cross-sectional area 376 of an intermediate section 336 of guiding unit 304 between first end 332 and second end 334. Accordingly, the remaining area of a cross section 378 near output opening 380 that allows the air to flow may be substantially reduced, causing the density and/or the flow rate of the air to substantially increase. Advantageously, output air 382 may have a sufficient density and/or flow rate to effectively operate the tool.

Regulating element 350 may an integral part of guiding unit 304. Alternatively or additionally, regulating element 350 may be a replaceable part connected to first end 332 of guiding unit 304 and may be replaced with different regulating elements for satisfying different air density and/or airflow pattern needs/requirements. Regulating element 350 may have a ball shape and/or circular cross sections for minimizing manufacturing costs and for compressing the air in a homogeneous manner.

Figure 3C:
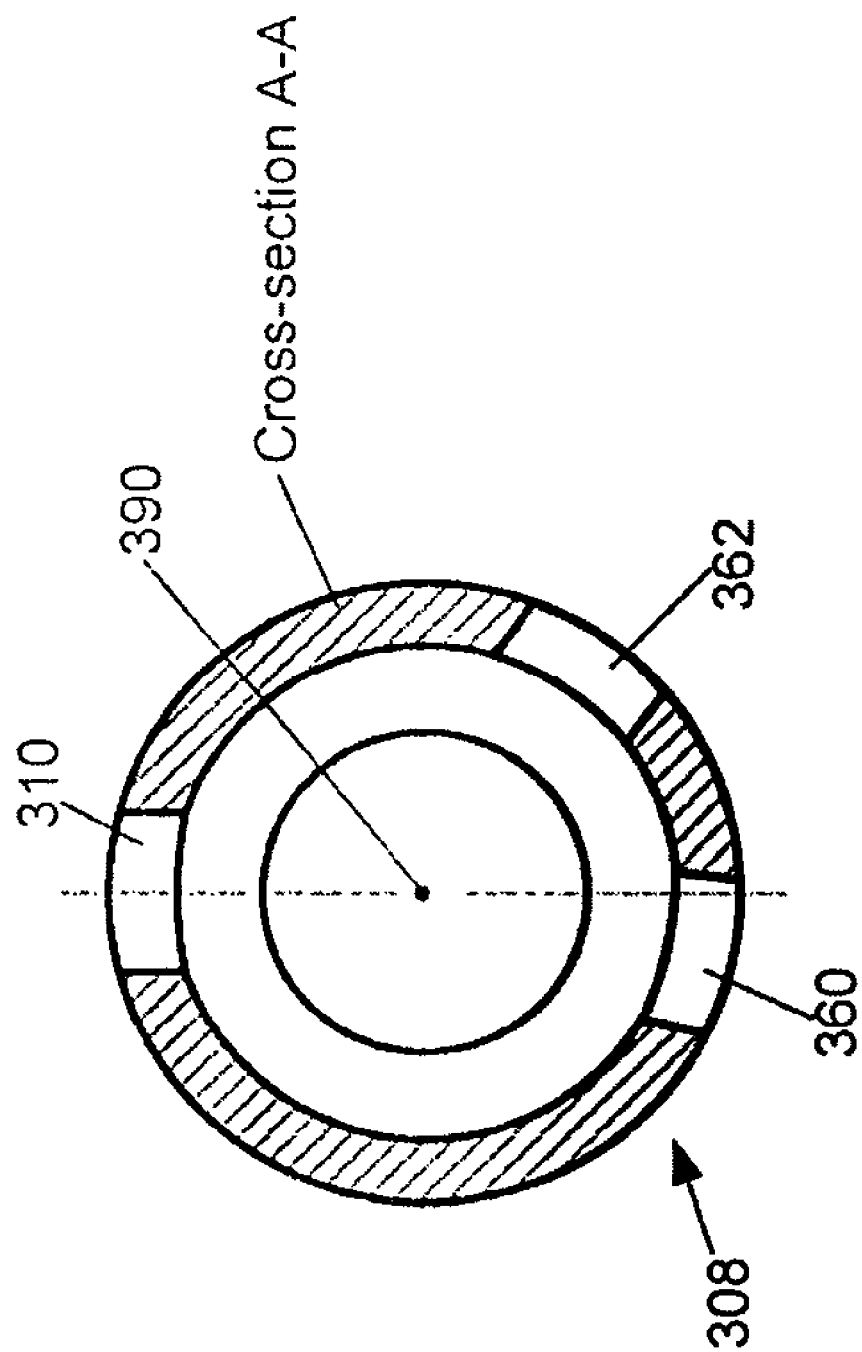
FIG. 3C shows a cross-section of a chamber of a gas-delivering device in accordance with one or more embodiments of the present invention.

FIG. 3C shows a cross-section A-A (indicated in the example of FIG. 3B) of chamber 308 of gas-delivering device 300 (illustrated in the examples of FIGS. 3A-3B) in accordance with one or more embodiments of the present invention. Cross-section A-A may have a circular shape and/or a different shape. Chamber 308 may include an even number or an odd number of input openings. The input openings may be symmetrically or asymmetrically distributed with respect to center 390 of cross-section A-A. As an example, chamber 308 may include an odd number of input openings 310, 360, and 362 asymmetrically distributed with respect to center 390 and not aligned such that conflicts between (and among) airflows received from the input openings may be reduced.

Figure 4:
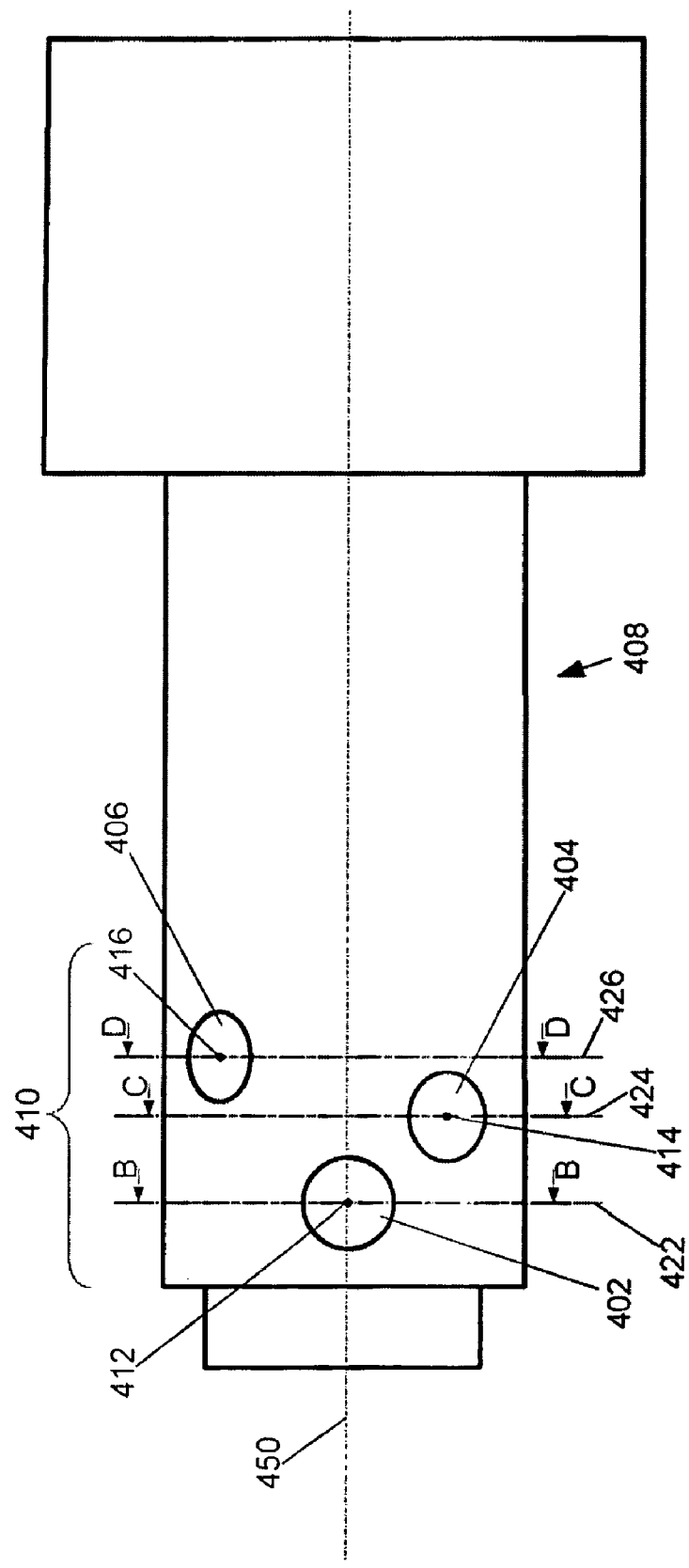
FIG. 4 shows a side view of a chamber of a gas-delivering device in accordance with one or more embodiments of the present invention.

FIG. 4 shows a side view of a chamber 408 of a gas-delivering device in accordance with one or more embodiments of the present invention. The gas-delivering device may also include a guide similar to, for example, guide 202 illustrated in the examples of FIGS. 2A-2B or guide 302 illustrated in the examples of FIGS. 3A-3B. Chamber 408 may include obliquely distributed input openings and/or not aligned input openings such that conflicts between (and among) airflows received from the input openings may be reduced. For example, chamber 408 may include a cylindrical portion 410 and may include input openings 402, 404, and 406 that are obliquely distributed at cylindrical portion 410 and are not aligned. Specifically, center 412 of input opening 402 may be disposed on a plane 422 that contains a circular cross-section B-B of chamber 400; center 414 of input opening 404 may be disposed on a plane 424 that contains a circular cross-section C-C of chamber 400; center 416 of input opening 406 may be disposed on a plane 426 that contains a circular cross-section D-D of chamber 400. Input openings 402, 404, and 406 are not on a same plane (such as plane 450) that contains the center line of chamber 400. One or more of input openings 402, 404, and 406 may also be not aligned with one or more of other input openings (not shown) of chamber 400. As a result, conflicts between (and among) airflows received chamber 400 may be reduced, and energy may be conserved.

As can be appreciated from the foregoing, embodiments of the invention may minimize conflicts between airflows, guide the airflows, and compress the airflows in delivering air to tools. Accordingly, embodiments of the invention may enable conservation of energy. Embodiments of the invention may also enable effective supply of power by directionally boosting airflow flow rates and/or by increasing airflow density levels. Advantageously, embodiments of the invention may offer desirable power supply with superior energy efficiency over prior art devices. In contrast, with prior art devices, increasing the flow rates of the airflows may aggravate the conflicts between the airflows to cause further waste of energy without effectively increasing the supplied power.

While this invention has been described in terms of several embodiments, there are alterations, permutations, and equivalents, which fall within the scope of this invention. It should also be noted that there are many alternative ways of implementing the methods and apparatuses of the present invention. Furthermore, embodiments of the present invention may find utility in other applications. The abstract section may be provided herein for convenience and, due to word count limitation, may be accordingly written for reading convenience and should not be employed to limit the scope of the claims. It may be therefore intended that the following appended claims be interpreted as including all such alternations, permutations, and equivalents as fall within the true spirit and scope of the present invention.

What is claimed is:

1. A device for delivering one or more gases, the device comprising:
   a chamber including at least a set of input openings for receiving the one or more gases and an output opening for providing the one or more gases, the set of input openings including at least a first hole and a second hole, the chamber being configured to receive a first portion of the one or more gases through the first hole, the chamber being further configured to receive a second portion of the one or more gases through the second hole; and
   a guide including a guiding unit, the guiding unit being disposed inside the chamber, the guiding unit being configured to contact the first portion of the one or more gases before the first portion of the one or more gases contacts the second portion of the one or more gases, the guiding unit being further configured to contact the second portion of the one or more gases before the second portion of the one or more gases contacts the first portion of the one or more gases, the guide further including a regulating element disposed at a first end of the guiding unit, wherein the first end of the guiding unit is disposed closer to the output opening than a second end of the guiding unit, a cross-sectional area of the regulating element is greater than a cross-sectional area of an intermediate section of the guiding unit, and the intermediate section of the guiding unit is disposed between the first end of the guiding unit and the second end of the guiding unit.

2. The device of claim 1 wherein
a cross-sectional area of the first end of the guiding unit is smaller than a cross-sectional area of the second end of the guiding unit.

3. The device of claim 2 wherein
a cross-sectional area of the intermediate section of the guiding unit is smaller than the cross-sectional area of the second end of the guiding unit, and
the cross-sectional area of the intermediate section of the guiding unit is larger than the cross-sectional area of the first end of the guiding unit.

4. The device of claim 2 wherein an imaginary guiding unit axis that connects the first end of the guiding unit and the second end of the guiding unit is configured to align with a direction in which the one or more gases is provided from the device to a tool.

5. The device of claim 2 wherein the set of input openings are configured to surround the second end of the guiding unit.

6. The device of claim 1 wherein the regulating element is a replaceable part connected to the first end of the guiding unit.

7. The device of claim 1 wherein the regulating element is an integral part of the guiding unit.

8. The device of claim 1 wherein a length of the guiding unit is at least two thirds of a distance between the first hole and the output opening.

9. The device of claim 1 wherein a length of the guiding unit is at least a distance between the first hole and the output opening.

10. The device of claim 1 wherein
the chamber includes at least a chamber thread, and
the guide includes at least a guide thread, the guide thread configured to engage the chamber thread.

11. The device of claim 1 wherein the guiding unit is configured to occupy at least one tenth of space inside the chamber.

12. The device of claim 1 wherein the guiding unit includes at least a cone-shaped portion.

13. The device of claim 1 wherein the guiding unit is cone-shaped.

14. The device of claim 1 wherein the set of input openings represents an odd number of input openings.

15. The device of claim 1 wherein the input openings are asymmetrically distributed with respect to a center of a circular cross-section of the chamber.

16. The device of claim 1 wherein the input openings include at least a first input opening and a second input opening, the first input opening having a first center, the first center disposed on a first plane, the first plane containing a first circular cross-section of the chamber, the second opening having a second center, the second center disposed on a second plane, the second plane containing a second circular cross-section of the chamber.

17. An apparatus for use in a gas-delivering device, the gas-delivering device including at least a chamber, the chamber including at least a set of input openings for receiving one or more gases and an output opening for providing the one or more gases, the set of input openings including at least a first hole and a second hole, the chamber being configured to receive a first portion of the one or more gases through the first hole, the chamber being further configured to receive a second portion of the one or more gases through the second hole, the apparatus comprising:

a guide including a guiding unit, the guiding unit being configured to be disposed inside the chamber, the guiding unit being further configured to contact the first portion of the one or more gases before the first portion of the one or more gases contacts the second portion of the one or more gases, the guiding unit being further configured to contact the second portion of the one or more gases before the second portion of the one or more gases contacts the first portion of the one or more gases, the guide further including a regulating element disposed at a first end of the guiding unit, the first end of the guiding unit being disposed closer to the output opening than a second end of the guiding unit, a cross-sectional area of the regulating element being greater than a cross-sectional area of an intermediate section of the guiding unit, the intermediate section of the guiding unit being disposed between the regulating element and the second end of the guiding unit; and a coupling portion connected with the guiding unit and configured to couple the guide with the chamber.

18. The apparatus of claim 17 wherein
a cross-sectional area of the first end of the guiding unit is smaller than a cross-sectional area of the second end of the guiding unit.

19. The apparatus of claim 18 wherein
the cross-sectional area of the intermediate section of the guiding unit is smaller than the cross-sectional area of the second end of the guiding unit, and
the cross-sectional area of the intermediate section of the guiding unit is larger than the cross-sectional area of the first end of the guiding unit.

20. The apparatus of claim 17 wherein the regulating element is an integral part of the guiding unit.

* * * * *